US006834272B1

(12) United States Patent
Naor et al.

(10) Patent No.: US 6,834,272 B1
(45) Date of Patent: Dec. 21, 2004

(54) PRIVACY PRESERVING NEGOTIATION AND COMPUTATION

(75) Inventors: Simeon Naor, Tel Aviv (IL); Binyamin Pinkas, Tel Aviv (IL)

(73) Assignee: Yeda Research and Development Company Ltd., Rehovot (IL)

( * ) Notice: Subject to any disclaimer, the term of this patent is extended or adjusted under 35 U.S.C. 154(b) by 0 days.

(21) Appl. No.: 09/428,695

(22) Filed: Oct. 28, 1999

Related U.S. Application Data

(60) Provisional application No. 60/148,047, filed on Aug. 10, 1999.

(51) Int. Cl.$^7$ .............................................. G06F 17/60

(52) U.S. Cl. ............................ 705/80; 705/37; 705/74; 705/78; 380/255; 713/150

(58) Field of Search .............................. 705/80, 37, 51, 705/74, 78

(56) References Cited

U.S. PATENT DOCUMENTS

| | | | | | |
|---|---|---|---|---|---|
| 5,495,532 | A | * | 2/1996 | Kilian et al. | 380/30 |
| 5,553,145 | A | * | 9/1996 | Micali | 380/30 |
| 5,615,269 | A | * | 3/1997 | Micali | 380/49 |
| 5,666,420 | A | * | 9/1997 | Micali | 380/30 |
| 5,850,442 | A | * | 12/1998 | Muftic | 380/21 |
| 5,905,975 | A |   | 5/1999 | Ausubel | 705/1 |
| 6,026,163 | A | * | 2/2000 | Micali | 380/9 |
| 6,055,518 | A | * | 4/2000 | Franklin et al. | 705/37 |
| 6,085,178 | A | * | 7/2000 | Bigus et al. | 705/80 |
| 6,272,473 | B1 | * | 8/2001 | Sandholm | 705/37 |
| 6,285,989 | B1 | * | 9/2001 | Shoham | 705/37 |
| 6,363,365 | B1 | * | 3/2002 | Kou | 706/64 |
| 2001/0016838 | A1 | * | 8/2001 | Landrock | 705/80 |
| 2001/0038693 | A1 | * | 11/2001 | Luyster | 380/37 |

FOREIGN PATENT DOCUMENTS

| | | |
|---|---|---|
| WO | WO 01/11527 A2 * | 2/2001 |
| WO | WO 01/50379 A2 * | 7/2001 |
| WO | WO 01/54040 A1 * | 7/2001 |

OTHER PUBLICATIONS

Kutanoglu et al, "On Combinatorial Auction and Lagrangean Relaxation for Distributed Resource Scheduling", IIE Transactions, vol. 31, No. 9, Sep. 1999.*

(List continued on next page.)

*Primary Examiner*—John W. Hayes
(74) *Attorney, Agent, or Firm*—Fitch, Even, Tabin & Flannery

(57) ABSTRACT

A method for secure multi-party function evaluation with a non-limiting application to the holding of auctions. The outcome of an auction can be determined by an auctioneer without learning any information about the bids, except for the bid which determines the clearing price, and without learning any information about the bidders, except for the winning bidder. The security of this information is maintained even after the conclusion of the auction. Moreover, the bidders can individually and privately verify that the auction was conducted correctly, thereby establishing a mechanism for trust. The method is well-suited to the holding of privacy-protected auctions over computer networks because of its high efficiency, requiring only a single round of interactive communication without any communication among the bidders. Furthermore, the bulk of the computation and data communication or the protocol can be done in advance of the auction itself, and is adaptable to distribution via stored media. The function evaluated by the method can be generalized to any function which can be evaluated by a circuit of gates. The method can be applied in general as a secure multi-party function evaluation protocol, which, in addition to auctions, can also be applied to a number of other special cases, such as Generalized Vickrey Auctions, Groves-Clarke mechanisms, opinion polling, and stable matching.

22 Claims, 8 Drawing Sheets

OTHER PUBLICATIONS

Gagliano et al, "Auction Allocation of Computing Resources", Communcations of the ACM, vol. 38, No. 6, pp 88–102, Jun. 1995.*

Feldman et al, "Auctions: Theory and Applications", International Monetary Fund Staff Papers, vol. 40, No. 3, pp 485–511, Sep. 1993.*

"Electronic Auctions with Private Bids", M. Harkavy, J.D. Tygar and H. Kikuchi, $3^{rd}$ *USENIX Workshop on Electronic Commerce*, pp. 61–73, 1999.

"The Design and Implementation of a Secure Auction Server", M. K. Franklin and M. K. Reiter, *IEEE Transactions on Software Engineering* 22(5), pp. 302–312, 1996.

"How to Plan Any Mental Game", O. Goldreich, M. Micali and A. Wigderson, *Proceedings of the $19^{th}$ ACM Symposium on theory of Computing*, 1987, pp. 219–229.

"How to Generate and Exchange Secrets", A. C. Yao, *Proceedings of the $27^{th}$ IEEE Symposium on Foundatins of Computer Science*, 1986, pp. 162–167.

* cited by examiner

US 6,834,272 B1

PRIVACY PRESERVING NEGOTIATION AND COMPUTATION

RELATED APPLICATIONS

This application is based on, and claims the benefit of, U.S. Provisional Patent Application No. 60/148,047, filed on Aug. 10, 1999.

FIELD OF THE INVENTION

The present invention relates to the field of cryptographic protocols in general, and, more particularly, to secure function evaluation with application to the holding of networked auctions by computer.

BACKGROUND OF THE INVENTION

Many applications involve a group of participants, denoted herein as "parties", each of whom has an input to the group as a whole, where the group as a whole is required to compute and output a certain function of these inputs. The term "function" herein denotes, in the usual sense, any mathematical or logical mapping from one set of input entities to a output entity or set of entities. In certain cases, the inputs may involve sensitive information, such that it would also be required that this computation does not reveal any information about the inputs, except for whatever might be computed from the final output. Such inputs are herein denoted as "private inputs". If, in addition to the parties, there were furthermore a trustworthy participant, denoted herein as a "center", and which is trusted by all the parties, then each party could simply send the respective private input to this center, which would then compute the function and publish, or output, the value of the computed function. (The center is a participant in the protocol and is involved in the computation of the function, but has no private input and is not within the group of parties.) The parties, however, might not trust each other, and might not trust any single center.

A particular case of interest is that of auctions. Consider, for example, sealed-bid second-price auctions, commonly known in the art as "Vickrey auctions". In a Vickrey auction, an auctioneer (the center) presents an item for sale to a group of bidders (the parties). Each interested bidder sends a bid to the auctioneer, which is to be kept private from all other bidders, and to be examined by the auctioneer together with all the other bids at the end of the published bidding period. In a Vickrey auction, the winner is the highest bidder, and the winner pays the amount of the second highest bid. The Vickrey auction is a non-interactive sealed-bid simulation of the popular interactive auction method in which the price is raised until only a single bidder remains, commonly known in the art as the "English auction". In an English auction, the remaining bidder wins the auction and has to pay the price at which he was left as the last bidder. Because the English auction is interactive, constant attention of the bidders is required, and in certain situations it may be desirable to simulate the English auction with the non-interactive Vickrey auction. In a Vickrey auction, the best strategy for a bidder is simply to set his bid to be exactly how much he values the item for sale, thereby greatly reducing the work, attention, and communication needed to conduct and participate in the auction.

The Vickrey auction is thus a highly desirable auction method, but there are certain serious limitations thereto, concerning trust and privacy. For example, note that a corrupt auctioneer can easily cheat by examining the bids before the end of the bidding period and inserting a fake bid which is just slightly lower than the highest bid. This artificially and dishonestly increases the amount that the winner is required to pay. Unlike the English auction, where the bidding is public, the bids in a Vickrey auction are private, so there is currently no way for any of the bidders to individually verify that the auctioneer conducted the auction honestly.

Another limitation of the Vickrey auction involves privacy and stems from the fact that the auctioneer examines all bids and can use the information thereby gathered in order to cheat in future auctions. Suppose, for example, that at the end of an auction the auctioneer learns that the highest bidder valued the item for sale at $1000. Then, if the auctioneer subsequently auctions a second such item (even in a non-Vickrey auction, such as an English auction) and the highest bidder from the previous auction participates in this subsequent auction as well, the auctioneer can insert fake bids which are very close to $1000 with the intention of dishonestly increasing the amount the winner would have to pay. Because the auctioneer has obtained this information in advance of the subsequent auction, the fake bids could even be inserted by other dishonest bidders during the auction, in collusion with the auctioneer.

The potential for frauds of this sort deters many parties from participating in such auctions, or at least in auctions that are not run by highly respectable auctioneers. The value of auction methods such as the Vickrey auction is great enough that it is desirable to have a way for each of the bidders to individually verify that the auction was conducted honestly, and in such a way that the auctioneer does not acquire information from the bidders that could be used for dishonest purposes.

Another closely-related application is mechanism design, which deals with the design of protocols for selfish parties. The goal of a protocol is to aggregate the preferences of the parties in order to decide on some social choice (for example, to decide whether a community should build a bridge, or how to route packets in a network, or to decide who wins an auction). Each party has a utility function which expresses how much that party values each possible outcome of the protocol (the bid in an auction, for example, is such a utility function). Each party sends information about its utility function to a center, which decides on the outcome of the protocol based on the reports from the parties, according to a specified function of the utility functions (for example, in a sealed-bid auction, the specified function that determines the winner is the maximum of the bids). Of course, a party might choose to report according to a false utility function if some benefit can be derived therefrom (for example, by submitting a fake bid at an auction, in collusion with a dishonest auctioneer, as described above). The goal is to come up with mechanism designs in which it is not beneficial for any party to report a false utility function.

The "revelation principle" states that for any mechanism there is a direct, incentive-compatible mechanism with the same result. That is, that there is an equivalent mechanism in which the optimal strategy for each party is to report the true utility function. It is often assumed that the center can be trusted by the parties, but this might not always be true, especially in an Internet setting. The revelation principle might not be valid if the center is corrupt and misuses the truthful utility functions that are received. Keeping the utility function private from the center is therefore essential in order to ensure the center's honesty.

Various approaches to this general problem appear in the prior art, as proposed in the field of cryptographic research pertaining to secure function evaluation. For any function $f(x_1, x_2, \ldots, x_n)$ it is possible in principle to construct a protocol that allows a group of n parties, where party i has as its private input $x_i$, to jointly evaluate $f(x_1, x_2, \ldots, x_n)$. Following the completion of the protocol, the parties learn $f(x_1, x_2, \ldots, x_n)$ but no party i can learn more about the other private inputs beyond what can be computed from $x_i$ and $f(x_1, x_2, \ldots, x_n)$.

(The subscript notation of form "$x_i$" as used herein also appears in some related documents in the equivalent form "x.sub.i". Likewise, the superscript notation of form "$x^i$" as used herein also appears in some related documents in the equivalent form "x.sup.i".)

Since conducting an auction is an evaluation of a function of the bids (the private input utility functions), it is tempting to employ such a protocol in implementing auctions. However, the drawback is that these protocols are rather complex and require a lot of interaction between the parties. In the case of auctions, this would require high interaction between the bidders, who have no motivation to interact with each other. Furthermore, these protocols are secure only so long as less than a certain threshold of the bidders do not collude maliciously, and this is a weakness of these protocols, because it may be difficult or impossible to assure that such collusion does not occur. Such a protocol could be attacked, for example, by packing an auction with a suitably-large number of dishonest bidders who collude among themselves.

There also appears in the prior art methods for distributing the operation of an auctioneer between many servers in a way that is secure so long as not too many of these servers collude. Such a scheme is disclosed, for example, in "The Design and Implementation of a Secure Auction Server", by M. K. Franklin and M. K. Reiter, *IEEE Transactions on Software Engineering*, 22(5), pp. 302–312, 1996. Such a distributed system for sealed-bid auctions with many auctioneer servers ensures that the auctioneer servers do not learn the bids, but only until the time the bids are opened. Protocols of this sort are also the basis for the auction protocols disclosed in "Electronic Auctions wit Private Bids", by M. Harkavy, J. D. Tygar and H. Kikuchi, *3rd USENIX Workshop on Electronic Commerce*, pp. 61-73, 1999, which enables systems for secure fist-price and second-price sealed-bid auctions that preserve the privacy of the bids even after the winning bid is chosen. These systems distribute the operation of the auctioneer among several auctioneer servers, wherein privacy is guaranteed so long as not too many of the auctioneer servers collude. Most of the protocols require that fewer than one-third of the auctioneer servers collude, and therefore need a minimum of four auctioneer servers. As with the protocols specifying a threshold of colluding bidders, it is difficult or impossible to assure that such collusion does not occur in these systems based on auctioneer servers.

U.S. Pat. No. 5,905,975 to Ausubel discloses a method for auctioning multiple, dissimilar items without the value of highest (winning) bid becoming known to the auctioneer, by implementing the well known Groves-Clarke mechanism. Limitations of the Ausubel method, however, include the requirement for multiple rounds of communication between the participants in the auction, and less than optimal privacy for the bidders.

A related invention by the present inventors, "Honesty Preserving Negotiation and Computation", which is the subject of a separate patent application, introduces a method for ensuring the honesty of the center, and may be applied in a scenario in which each of the parties sends a private input to the center, which then computes and publishes the output of the function. This method enables the center to prove that the function was computed correctly, without requiring publication of the private inputs received from the parties. A limitation of this method, however, is that the center learns the private inputs of the parties. In an auction conducted according to this method, the auctioneer would learn the individual bids of each of the bidders.

Further limitations of the prior art involve the high interactivity required among the bidders and/or servers. The Franklin and Harkavy systems require bidders to communicate directly with all the servers. Furthermore, the Harkavy systems require high interactivity between the servers over many rounds of interaction. These requirements impose bandwidth and latency constraints and essentially imply that all servers be physically controlled by the same organization—in other words, the auctioneer. In such a case, privacy is attainable only if the auctioneer can be trusted not to combine the information held by these different servers. Such an assumption is not enforceable and cannot be verified by an outsider. The only meaningful protection afforded by such protocols is therefore against external break-in to the auctioneer's servers (assuming also that not too many of them are successfully attacked). This architecture therefore requires complete trust in the auctioneer, which might not be justified, for example, in the case of small Internet auctioneers. These limitations of the prior art methods are such that they are not practical for implementing trusted auctions.

There is thus a widely recognized need for, and it would be highly advantageous to have, a method and system by which a center can compute and publish a specified function of a set of utility functions provided by a set of independent parties, whereby the utility functions remain private, the parties can independently verify that the specified function has been computed correctly, the interactions within the center and its components are limited, the parties do not need to engage in interactions among themselves, the amount of intercommunication among the participants remains within a reasonable limit, and wherein the center acquires no information about the individual utility functions themselves. This goal is met by the present invention.

SUMMARY OF THE INVENTION

The present invention is of a method and system for allowing any number of parties, via a center, to collectively compute any function in a manner that preserves the privacy of the individual private inputs of the parties to the collective computation, even after the computation of the function has been completed, and in such a way that each party can independently verify that the function was computed correctly. The present invention requires only a modest amount of interaction, does not require that the parties interact with one another, and does not require that the center be distributed among non-colluding servers. Furthermore, the present invention can be used to implement general mechanisms and to compute general functions.

The term "protocol" herein denotes a complete and unambiguous method for accomplishing a purpose, whose steps specify a series of formal interactions in a required sequence which involve exchanges of information and computational steps on the information by two or more distinct individual entities, herein denoted as "participants"; all of whom fully know the method and agree to follow the specified steps thereof. The method according to the present invention is such a protocol, wherein the distinct participants include, but are not limited to, the parties, an issuer, and the center. The term "input" herein denotes information that is furnished to the protocol by one or more of the participants. Information furnished as an input to the protocol does not necessarily become available to any specified participant, however. Likewise, the term "output" herein denotes information that is furnished by the protocol to one or more of the participants. Information furnished as an output by the protocol also does not necessarily become available to any specified participant. The purpose of this protocol is to compute a function in a way that can be verified individually by the participants, while imposing a well-defined limitation on the flow of information among the participants in terms of content and ultimate destination, including the generation and flow of meta-information (i.e., information about the information exchanged in the protocol), in order to preserve the privacy of the participants. It might be possible to interrupt the protocol, so that the desired function computation and flow of information is prevented, but a goal of the present invention is to make it statistically impossible, when operating within a set of constraints specified by the protocol, to defeat the privacy-protecting limitations of the protocol or to force a false computation of the function that would be undetectable to the participants. The constraints of the protocol include the requirement that certain specified participants do not collude to exchange information separate from the protocol. The term "attack" herein denotes any stratagem or method intended to defeat the limitations of the protocol.

Consider a scenario with N parties, each having a private input, and a center which should compute a function $f$ of these private inputs (for example $f$ can be the maximum of all the private inputs). The term "private input" herein denotes an input by a specific participant which is intended not to be generally available to any other participant. The present invention enables the center to compute and publish the output of $f$ and to prove to all parties that it computed $f$ correctly, but without revealing any information about the private inputs to the center or to any party, even after the value of $f$ is published.

The present invention achieves these properties by adding another participant, denoted herein as the "issuer", who generates a description corresponding to the function which allows computing the function (such as a program or circuit which evaluates the function), but who does not take any other active part in the protocol. In operation, the center and the issuer jointly evaluate the function using a secure two-party function evaluation in which only the center learns the output of the function, but the center does not learn the values of the inputs to the function. Since both the center and the issuer each learn only portions of the inputs, neither of them learns the inputs. In the case of auctions, as long as the auctioneer (the center) and the issuer do not collude, then neither of them learns any information about the bids (the private inputs), even after the auction is over. The protocols do not require any communication between the bidders and the issuer, and the computational efficiency is very high.

In particular, the parties can be bidders in an auction, their private inputs are their bids, the center is the auctioneer, and the function $f$ is the rule by which the outcome of the auction is decided. The present invention enables the auctioneer to compute the result of the auction without learning any information about the bids, except for the identity of the winner, and the amount the winner has to pay.

One of the embodiments of the present invention is a system for computing second-price sealed-bid auctions (Vickrey auctions). However the system can be used to privately implement other mechanisms, such as first-price or kth price auctions, auctions with reservation prices, double-auctions (where there are many sellers), generalized Vickrey auctions, Groves-Clarke mechanisms, and the like. Furthermore it is possible to use the method of the present invention for tasks such as stable matching (such as for residents and hospitals), and for decision-making.

Advantages of the present invention over the prior art include:

1. The center computes the function without leaning any information about the private inputs, except for the final output of the function. This property holds even after the center computes the value of the function. The method according to the present invention thus ensures the privacy of the parties from the center and from all the other parties. In the case of auctions, this property is important when the same auctioneer performs several auctions. If the auctioneer learns the values of the bids in an initial auction, this information can be used dishonestly to increase the amount that winners have to pay in the subsequent auctions. The privacy property of the present invention prevents such behavior by the auctioneer.

2. The center can prove that it computed the function correctly, even though it does not know the values of the private inputs of the different parties.

3. Neither the center nor the issuer can learn by itself any information about the private inputs of the parties. Only if the center and the issuer collude can any information be learned about the private inputs. The private inputs are therefore essentially locked in a vault with two locks, with one key being held by the center and the other key held by the issuer. In the case of a sealed-bid auction, the method according to the present invention enables the implementation of a sealed-bid auction electronically, while ensuring that the auctioneer cannot cheat and does not even learn the values of the bids.

4. The security and reliability of the method according to the present invention do not require trust in any party. It is required only that the center and the issuer do not collude.

5. There are no disputes. All parties can verify that the center computed the function correctly and that the issuer did not cheat.

6. The method according to the present invention requires very little interaction: only a few messages need to be exchanged between the center and each of the parties, and between the center and the issuer. In particular, the number of rounds of communication is constant and does not depend on the number of parties. No communication is required among the parties themselves, nor between any party and the issuer.

7. The method can be applied to many variants of the function $f$, such as for first-price auctions, second-price auctions, or for double auctions. The function $f$ can also be for a mechanism design, for polling opinions, for computing a stable matching, and for other applications.

8. The function $f$ can be defined to reveal some information about the inputs. For example the output of $f$ can include some statistics of the private inputs, such as the mean or variance.

A goal of the present invention is to minimize the trust that bidders are required to put in the auctioneer in sealed-bid auctions as well as in more general mechanisms. This goal is especially important in online auctions where there are seldom any long-term relationships between bidders and auctioneers, and where there may be many small-scale auctioneers that offer auctions of different sorts.

Another goal of the present invention is to control and restict the nature and amount of information that becomes known to the auctioneer in the course of conducting an auction. For example in the case of second-price auctions the auctioneer should learn the identity of the highest bidder (but not his bid!) along with the clearing price, which is the amount the winner has to pay, in this case the second-highest bid. Neither the bidders nor the auctioneer, however, should learn the identity of the second-highest bidder, nor any information about the other bids. The present invention, in fact, offers bidders better privacy in the above respects than suctions conducted in the physical realm, where sealed-bid auctions are carried out using bid written on paper and enclosed in sealed envelopes. Still, all the bidders should be able to verify that the auction was run correctly, that the highest bidder won, and that the clearing price is correct.

Despite the need for privacy in the bidding, there are aspects of the bids that are of legitimate interest to auctioneers. This information, for example, might concern the statistics of the bids, and could be valuable in attracting sellers and buyers to the auctions. Therefore, a further goal of the present invention is to allow an auctioneer to use the bids to gather useful and legitimate information. There might be a tension between the bidders, who prefer that the auctioneer not learn any information but the outcome of the auction, and the auctioneer, who prefers to gather as much information as possible. Accordingly, the present invention enables control of exactly what information becomes known to the auctioneer. For example, the auctioneer might be allowed to learn some aggregate statistics of the bids (e.g. the average bid, or the percentage of bids within a certain range), while still being prevented from learning the identity of the bidders who are associated with a certain bid or range of bids. All such variants can be easily incorporated into the scheme.

The method according to the present invention employs several techniques developed for two-party secure function evaluation and achieves efficient communication in multi-party protocols, such as in multi-party protocols for auctions, by assigning different roles to the parties, the center, and the issuer.

The invention involves several entities, as described and illustrated below in terns of the non-limiting special case of auctions. As noted previously, the method according to the present invention is applicable to many different situations. In the case of auctions, the parties are bidders, and the center is the auctioneer. The present invention operates in the general case in a manner similar to that of the special case of auctions. Described and illustrated herein are the main components, along with the trust and complexity requirements of the protocol.

The different participants in a secure multi-party function evaluation according to the present invention are depicted in FIG. 1, in terms of the non-limiting special case of auctions. In one of the embodiments, there is an issuer 102; at least one auctioneer, such as an auctioneer 104, an auctioneer 106, and an auctioneer 108; and at least two bidders, such as a bidder 110, a bidder 112, and a bidder 114.

Bidders: Many bidders may participate. In the simplest case one or some of the bidders are parties who wish to sell items, and the rest of the bidders are interested in buying these items. In the general case the bidders are parties who should allocate some resources using a predefined mechanism. The bidders send a message to an auctioneer, which describes (in an "encrypted" way) a utility function (the private input), and at the end of the protocol they can verify the operation of the auctioneer. In a variation, the bidders are sellers and the auctioneer is the buyer.

Auctioneer: The auctioneer promotes the auction, such as by advertising, receives the bids from the bidders, communicates with the issuer, and computes the output of the protocol. The auctioneer might be a party which merely organizes the auction or the mechanism, but also might be one of the bidders (for example the auctioneer might be selling an item which all other bidders are interested in buying). The present invention allows the auctioneer to participate in the auction as a bidder without creating a conflict of interest or giving the auctioneer an unfair advantage. The present invention ensures that the auctioneer cannot learn by itself any information about the bids, except for computing the desired outcome of the protocol.

Issuer: The issuer creates a coded program that computes the output of the protocol in a way that preserves privacy, and finishes the coded program to the auctioneer. The preparation of the coded program can be done prior to the auction, and does not depend on the identities of the auctioneer or the bidders. The issuer does not interact with the bidders, and performs only a single one-round interaction with the auctioneer after the auctioneer receives the bids. The issuer is therefore a service provider which provides coded programs for many auctions carried out by many auctioneers.

Consider an ideal model in which there is an auctioneer who is fully trusted by all the bidders. There is a trivial way to perform an auction in this model: all bidders send their bids to the trusted auctioneer, who then computes and outputs the results. Note that even in this model some information is leaked about the bids. For example the highest bidder and the clearing price might be published. At the other extreme, this information might be only revealed to the highest bidder and to the seller. There are many possible variations regarding the information that is learned by different parties. Even here, the winner learns that he met the winning criteria, which itself reveals some information about the other bids, but this is inevitable.

The protocol of the present invention provides the highest degree of privacy, by ensuring that no party learns more information than would be learned in the ideal model. Even the auctioneer or the issuer cannot learn more than in the ideal model. As presented herein, the protocol differs from that of the ideal model, in that the issuer is able to learn the number of bidders. It is easy to prevent this, however, if there is a bound on the number of bidders.

Only if both the auctioneer and the issuer collude can the privacy of the bidders be compromised. Bidders need only trust that the issuer and the auctioneer do not collude to learn their bids, and are assured that the issuer or the auctioneer alone cannot learn more than in the ideal model. A coalition of the auctioneer with several bidders is also no more powerful than in the ideal model, and cannot learn the bids of other bidders. The bidders are therefore required to have a lesser amount of trust in these parties than in their banks, credit card companies, or in the companies that supply their software. The auctioneer can be any party that wishes to organize an auction, while the issuer should typically be an established party like a financial institution or a large company, which supplies services to many auctioneers. The issuer does not perform any communication with the bidders, but only with the auctioneers. This is of benefit to the auctioneers, because there is no risk that the issuer might take away the auctioneers' customers.

It is required that the public key of the issuer be known to the bidders. Besides this, there is no requirement for any Public Key Infrastructure (PKI).

The communication flow among the participants of the system according to the present invention for a single issuer and single auctioneer is illustrated in FIG. 2. Issuer 102 receives information from an auctioneer 202 via a path 212 and sends information to auctioneer 202 via a path 210. Bidder 110 sends information to auctioneer 202 via a path 204, bidder 112 sends information to auctioneer 202 via a path 206, and bidder 114 sends information to auctioneer 102 via a path 208.

The steps of the method according to the present invention for a single issuer and a single auctioneer are shown in FIG. 3, which also illustrates conceptually the information objects generated and transmitted as part of the protocol.

In a step 302, the auctioneer publishes an invitation for bidders to participate in the auction. Details of this publication include the items for sale, rules by which the winning bids are chosen, minimum bids (if any), the closing time by which bids are due, and the issuer supporting the auction. In a step 304, the bidders prepare their bids and put them into a message 308 which contains a first portion 312 encrypted with a public key 306 belonging to the issuer along with a second portion 310 which may be read by the auctioneer. In a step 314 the bidders submit these messages to the auctioneer. Because portion 312 of message 308 is encrypted using a non-malleable encryption with issuer public key 306, the auctioneer cannot learn from message 308 the content of the bids. Following this, in a step 316, the auctioneer sends encrypted portion 312 to the issuer. Because the issuer does not receive the entire message 308, but only portion 312 thereof, the issuer cannot learn the content of the bids, either. In a step 318 the issuer generates a combinatorial circuit, herein denoted as a "circuit", such as a circuit 320 to compute the outcome (output) of the auction. Circuit 320 is made of Boolean gates (such as AND, OR, and NOT) that perform this task. The term "gate" herein denotes any such device, real or virtual, which has at least one input each having at least two distinct states, and at least one output having at least two distinct states, and such that the output is a well-defined function of the inputs. The function evaluated by the present invention can be any function which can be evaluated by a circuit of gates, herein denoted as a circuit "corresponding to" the function. Circuit 320 is not a physical circuit but in effect an equivalent description of such a circuit which can be used to simulate the operation of such a circuit. The issuer then garbles circuit 320 according to a secure function evaluation protocol, as described in detail below. In a step 322 the issuer also decrypts message 312 and in a step 324 uses the decrypted results to similarly compute garbled inputs to circuit 320. In a step 328 the issuer prepares a signed translation table 330 which decrypts the output of the garbled circuit having inputs 326. In a step 332, the issuer sends garbled circuit and inputs 326 and signed translation table 330 to the auctioneer. Next, in a step 334, the auctioneer uses garbled circuit and message 310 and inputs 326 and signed translation table 330 to compute the results of the auction, and in a step 336, the auctioneer publishes the auction results, along with signed translation table 330.

It should be noted that the only additional communication channel required by this protocol (compared to a protocol with no security at all) is for a single round of communication between the auctioneer and the issuer after receipt of the bids. Furthermore, as is depicted in FIG. 3, the issuer can generate circuit 320 in step 318 and produce a garbled version thereof in advance of the auction, and send the garbled circuit to the auctioneer even before the auction begins, such as on a DVD or another mass storage device. This message with the garbled circuit contains the bulk of the communication required by the protocol.

Therefore, according to the present invention there is provided a method for the secure evaluation of a function by a group of participants, wherein each of a plurality of parties furnishes a private input to the function, and wherein, except for what may be deduced from the output of the function, the function is evaluated without any participant learning any information about the private input of any other participant, the method including the steps of: (a) providing an issuer as a participant, the issuer being operative to preparing a description corresponding to the function; (b) providing a center as a participant, the center being operative to evaluating the function from the description; (c) each of the plurality of parties sending a private input such that only the issuer learns a first portion of the private input, and such that only the center learns a second portion of the private input, wherein both the first portion and the second portion are necessary to learn the private input; and (d) the issuer and the center evaluating the function from the description by engaging in a secure two-party function evaluation, such that only the center learns the output of the function, and such that the center does not learn the private inputs thereto.

Furthermore according to the present invention there is also provided a method for Proxy Oblivious Transfer of a selection by a first participant from an ordered set prepared by a second participant to a third participant, wherein the third participant learns the selected item of the set but does not learn the order of the selection, the first participant learns nothing, and the second participant learns nothing, the method including the steps of: (a) the first participant preparing a plurality of public keys, one for every possible selection, and a private key corresponding only to the actual selection thereof; (b) the second participant preparing a plurality of encryptions, one of each of the ordered set, using the corresponding public key of the plurality of public keys; and (c) the third participant decrypting the plurality of encryptions with the private key to recover the selected item.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
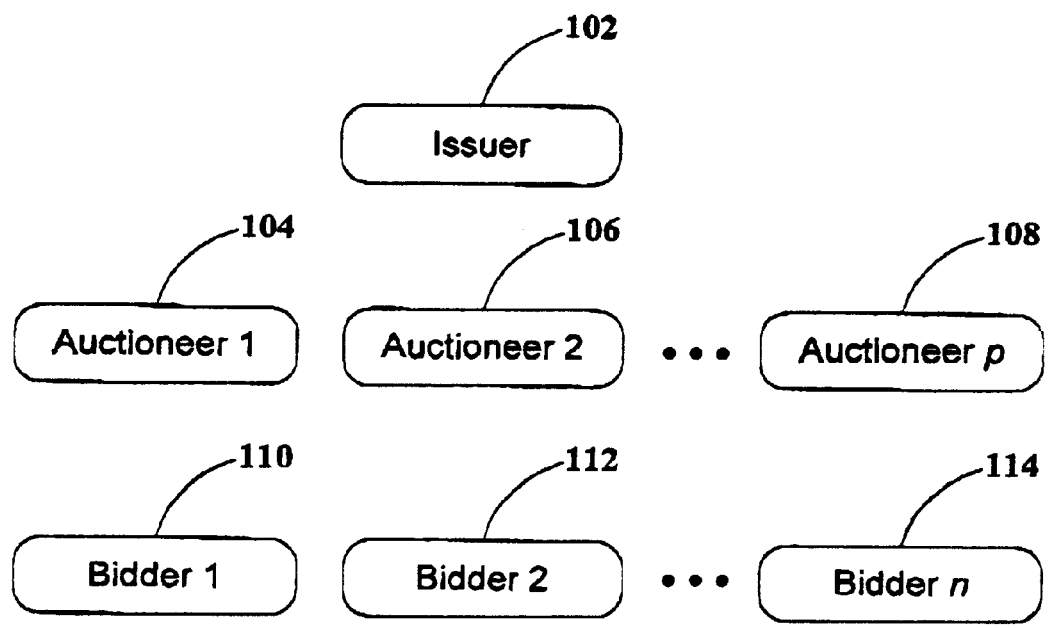
FIG. 1 illustrates the participants in an auction according to the present invention, with a single issuer, many (p) auctioneers, and many (n) bidders.

The principles and operation of a method and system for collectively computing a function according to the present invention may be understood with reference to the drawings and the accompanying description, which cover the complete protocol and illustrate a preferred embodiment thereof in terms of the special non-limiting case of the method as applied to the running of secure auctions.

The present invention uses two types of cryptographic tools that are well-known in the art: pseudo-random functions via encryption functions, and "Oblivious Transfer" (OT).

Pseudo-Random s

A "pseudo-random" is one that cannot be distinguished from a truly random function by an observer who has access to the function in a black-box manner. That is, the function F is specified by a short key K and the observer can access the function $F_K$ only by adaptively specifying inputs and getting the value of the function on these inputs. A common assumption made in the art is that block ciphers (such as DES, or triple DES), or a keyed one-way hash function with a random key (such as HMAC), can model pseudo-random s. That is the function $F_K(x)$ can be implemented by keying a block cipher with the key K and encrypting x, or keying a hash function with K and applying it to x. Pseudo-random s can therefore be efficiently implemented.

Oblivious Transfer

The following two-party protocol is known in the art as "1-out-of-2 Oblivious Transfer" (1-out-of-2 OT). The protocol involves two participants, a participant B that knows two secret values ($m_0$, $m_1$), and a participant A whose input is b which is either 0 or 1. At the end of the protocol A learns $m_b$ while leaning nothing about $m_{1-b}$, and B learns nothing about b. This is summarized below: That is, B has two secrets, and A selects and obtains exactly one of them without learning the other, while B does not learn which secret A selected.

Input:
 A: b (which is either 0 or 1)
 B: $m_0$, $m_1$
Output:
 A: $m_b$
 B: nothing Oblivious Transfer protocols are rather efficient, and include non-interactive protocols. The main computational overhead of the protocol is two public key encryptions which are done by B, and one public key decryption done by A.

Every known public-key cryptosystem can also implement Oblivious Transfer, although there is no general theorem for this. OT can be based on the existence of trapdoor permutations, factoring, the Diffie-Hellman assumption (both the search and the decision problems, wherein the latter yields more efficient constructions), and the hardness of finding short vectors in a lattice (the Ajtai-Dwork cryptosystem). On the other hand, it seems to be highly unlikely that Oblivious Transfer can be based on one-way functions.

Following are the details of an Oblivious Transfer protocol known in the prior-art:

Initialization:
 A and B agree on a large cyclic group $G_g$ generated by g.
  For such groups, the discrete logarithm problem is believed to be hard. In addition, A and B agree on an element c in $G_g$ for which neither knows the discrete logarithm.

Preparing the Query:
 A chooses a random value $0<r<|G_g|$,
 A calculates $PK_b=g^r$ and $PK_{1-b}=c/PK_b$. In the El Gamal public key cryptosystem these $PK_i$'s are public keys and r is the private key corresponding to $PK_b$.

Sending the values:
 A sends $PK_0$ and $PK_1$ to B.
 B verifies that $PK_0*PK_1=c$ (or alternatively, A sends only $PK_0$ and B calculates $PK_1=c/PK_0$).
 Using El Gamal encryption, B then sends to A the encryptions $E_{PK0}(m_0)$ and $E_{PK1}(m_1)$.

Receiving the desired value:
 With the private key corresponding to $PK_b$, A decrypts $E_{PKb}(m_b)$ to recover $m_b$.

A knows the private key for $PK_b$ but cannot possibly know the private key for $PK_{1-b}$ since if A did know this other key, then A could calculate the discrete logarithm of $c=PK_b*PK_{1-b}$. It therefore seems that A can only decrypt one the messages from B. Note, however, that although it is impossible for A to know both private keys, the protocol does not rule out the possibility that A might know some partial information about each of the keys (although there seems to be no obvious way in which A can obtain such information). This problem can be solved if A is required to prove knowledge of the discrete logarithm of one of the public keys to B (without disclosing to B which one). This proof can be efficiently done using methods known in the art at the cost of a few additional exponentiations. The resulting protocol is therefore as secure as the Decision Diffie-Hellman assumption, which is believed to be secure.

Figure 4:
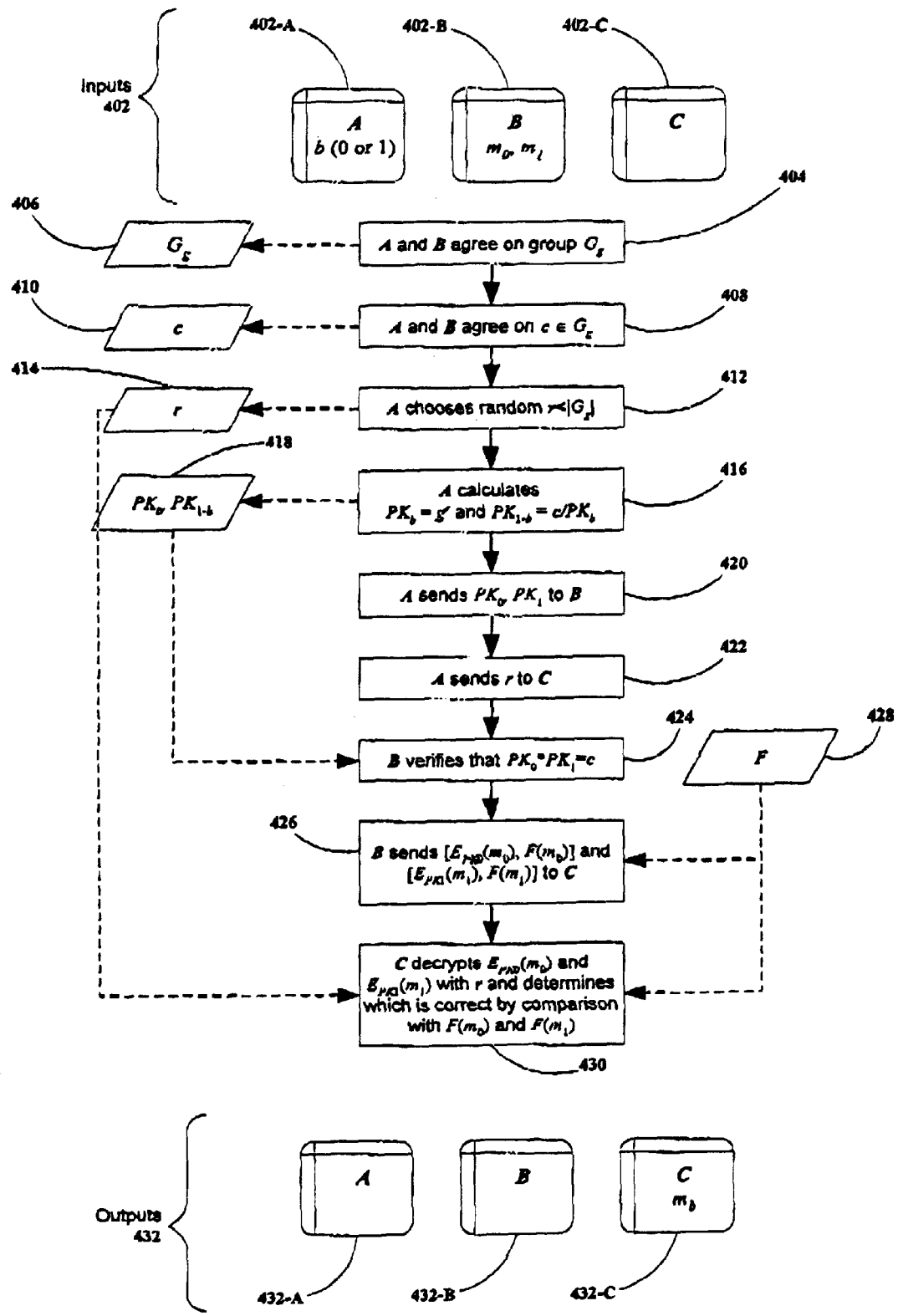
FIG. 4 illustrates a 1-out-of-2 Proxy Oblivious Transfer according to the present invention.

1-out-of-2 Proxy Oblivious Transfer:

As part of the present invention, the notion of Oblivious Transfer has been extended to a protocol herein denoted as 1-out-of-2 Proxy Oblivious Transfer. This protocol involves three participants: As before, there is B (who knows two inputs $m_0$ and $m_1$) and A (who has an input b that is either 0 or 1). There is also a third participant C who has no input. C serves as A's proxy for learning the output. At the end of the protocol, C learns $m_b$ while A and B learn nothing. Note that C does not learn b. The definition is summarized below, with reference to FIG. 4.

Input:
Inputs 402 include:
 A: b (which is either 0 or 1), in an input 402-A
 B: $m_0$, $m_1$, in an input 402-B
 C: nothing, in an input 402-C
Output:
Outputs 432 include
 A: nothing, in an output 432-A.
 B: nothing, in an output 432-B.
 C: $m_b$, in an output 432-C. Note that C does not learn the value of b.

Initialization:
 In a step 404 A and B agree on a large cyclic group $G_g$ 406 having a generator g, as in the 1-out-of-2 Oblivious Transfer protocol above, and in a step 408 A and B also agree on a number c 410 ($c \in G_g$) whose discrete logarithm is unknown.

Preparing the query:
 In a step 412 A chooses a random value r private key 414 such that $0<r<|G_g|$.
 In a step 416 A calculates a pair of public keys 418 where $PK_b=g^r$ and $PK_{1-b}=c/PK_b$.

Sending the values:

In a step 420 A sends pair $PK_0$ and $PK_1$ 418 to B.

In a step 422 A sends private key r 414 to C.

In a step 424 B verifies that $PK_0 * PK_1 = c$.

In a step 426 using El Gamal encryption, B then sends to C the following pair in random order: $[(E_{PK0}(m_0); F(m_0)), (E_{PK1}(m_1); F(m_1))]$, where F is a one-way function 428.

Receiving the desired value:

In a step 430 C uses private key r 414 corresponding to $PK_b$ to decrypt both $E_{PK0}(m_0)$ and $E_{PK1}(m_1)$. Only one of these will decrypt properly. C applies one-way function F 428 on both decryptions and compares them against the values supplied by B in step 426 to determine which one was decrypted correctly. Thus, C obtains $m_b$.

As noted previously, C does not learn the value of b, A's choice, but only $m_b$, the value corresponding to that choice. In order to achieve security depending only on the Decisional Diffie-Hellman assumption, it is required that A proves knowledge of the discrete logarithm of one of the keys, as in the protocol for 1-out-of-2 Oblivious Transfer.

As suggested by the embodiment above, Proxy Oblivious Transfer can be generalized to a protocol involving three participants, wherein the first participant makes a selection of from an ordered set of items (of arbitrary size) prepared by the second participant. The third participant (the proxy) learns the item selected but not the order of the selection, and the first participant and second participant learn nothing. In the general case, the first participant prepares a public key for every possible selection and a corresponding private key for only the desired selection. The first participant then sends the public keys to the second participant and the private key to the proxy. The second participant encrypts all the items with the corresponding public keys and sends the encryptions to the proxy along with a one-way hash of each item. The proxy then decrypts all the encrypted selections with the private key and compares their one-way hash functions with those supplied by the second participant to learn which one is the selected item.

To make the allowable selection from a set of arbitrary size (1-out-of-n Proxy Oblivious Transfer), it is sufficient to use 1-out-of-2 Proxy Oblivious Transfer in a set of n interactions to transfer n binary digits of information, thereby allowing a Proxy Oblivious Transfer of a selection made from a set of up to $2^n$ possible selections, wherein each selection is represented by a number containing one or more digits. In general, each digit has a value selected from a set of values (0 or 1 in the case of binary digits, as illustrated above; other bases are possible as well). If, in place of the actual selected value of the digit, an encryption of that value is employed, it is possible for the proxy to learn the encryption of the value of a digit without learning the value of the digit.

Secure Multi-Party Function Evaluation

The present invention is of a secure multi-party function evaluation that offers a number of significant improvements over the prior art. Following is a description of a secure function evaluation protocol for two participants, which is transformed by the present innovation into a protocol suitable for multiparty auctions.

Secure Two-Part Function Evaluation

Following is a discussion of a secure two-party function evaluation protocol based on the prior-art methods disclosed in "How to Generate and Exchange Secrets", by A. C. Yao, *Proceedings of the 27th IEEE Symposium on Foundations of Computer Science*, 1986, pages 162–167. This protocol is run between two participants, A and B. The input of A is a value x and the input of B is a description of a function $f$. At the end of the protocol A learns $f(x)$ (but no other information about $f$), and B learns nothing about x. Thus, the input x is a private input of A, and the function $f$ is a private input (a utility function) of B.

The protocol is based on expressing $f$ as a combinatorial circuit of gates which are over some fixed base (e.g. all the functions g: 0,1 times 0,1 to 0,1). The bits of the input are entered into input wires and are propagated through the gates.

Figure 5:
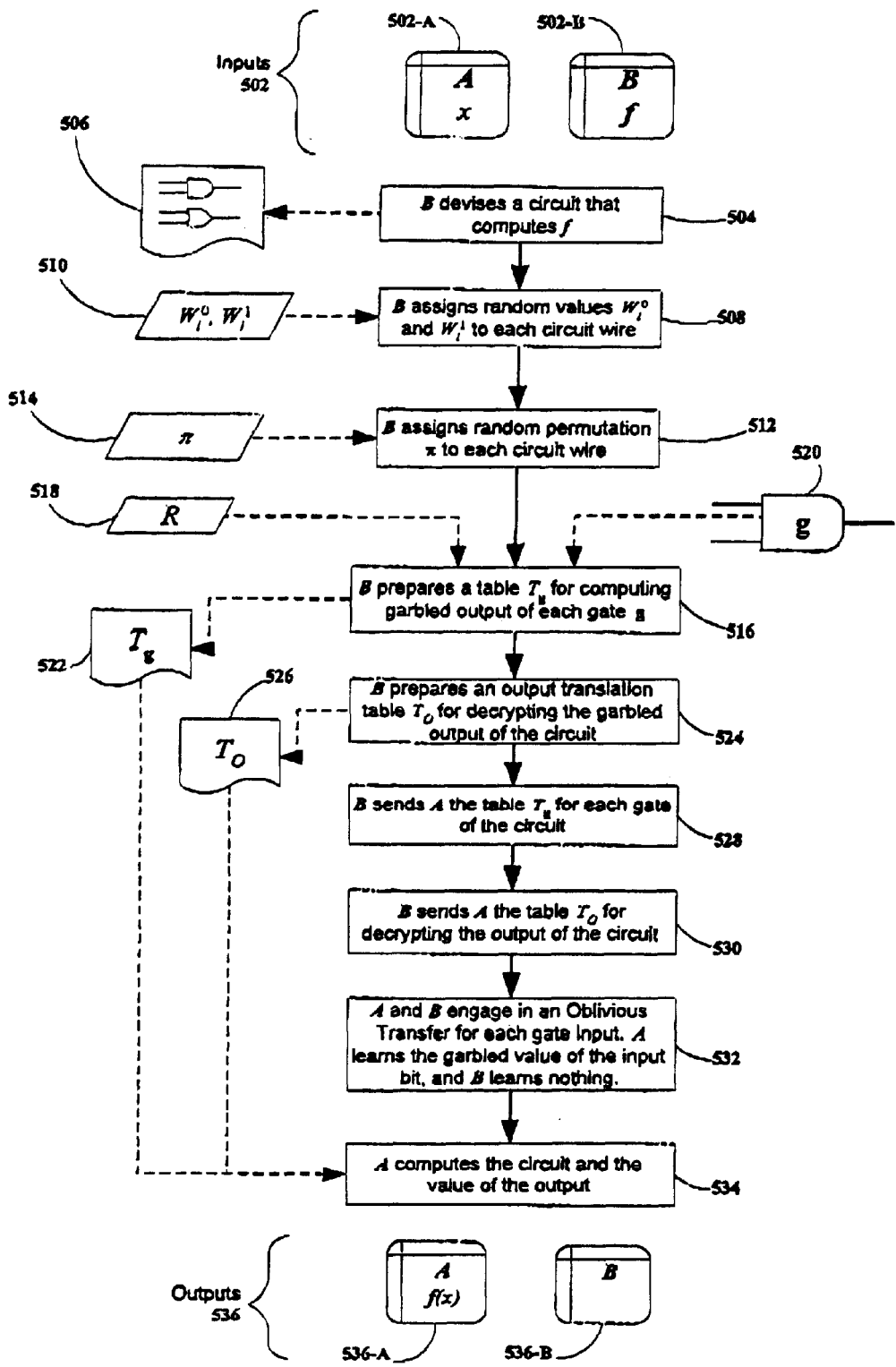
FIG. 5 illustrates a protocol for secure two-party function evaluation.

This procedure encrypts a circuit by generating a pseudorandom isomorphic transformation of the circuit. This encryption is herein referred to as a "garbling" of the coin The cyphertext of a circuit so encrypted by this procedure is herein denoted as a "garbled" circuit. This process is detailed below, with reference to FIG. 5.

Input:

Inputs 502 include:

A: a value x, in an input 502-A

B: a description of a combinatorial circuit which computes $f$, in an input 502-B.

Output:

Outputs 536 include

A: $f(x)$, in an output 536-A.

B: nothing, in an output 536-B.

The protocol is as follows:

Initialization

In a step 504 B devises a circuit 506 made of logic gates, such that circuit 506 computes $f$. The design of logic circuits made of gates that compute functions is well-known in the art.

Encrypting the Circuit:

In a step 508 B assigns to each wire i of circuit 506 two random values $(W_i^0, W_i^1)$ 510 corresponding to 0 and 1 values of wire i. The random values should be long enough to be used as keys (for example, 80 bits long). The value of wire i is denoted by $b_i$. In a step 512 B also assigns to wire i a random permutation $\pi$ 514 over 0,1, $\pi_k: b_i \to c_i$.

In a step 516 B uses a pseudo-random function R 518 to prepare a table $T_g$ 522 (or a set of tables, also denoted herein by $T_g$) which enables computation of the garbled output of each gate g 520, $(W_k^{b_k}, c_k)$, from the values $(W_i^{b_i}, c_i), (W_j^{b_j}, c_j)$, the garbled inputs to gate g. Table $T_g$ does not disclose any information about the output of gate g for inputs other than the pair $(b_i, b_j)$, nor discloses the values of the bits $b_i$, $b_j$, or $b_k$.

In a step 524 B prepares an output translation table $T_O$ 526 which decrypts the garbled output bits of the circuit (the cyphertext output) to the actual bits of the output of the circuit (the cleartext output).

Figure 6:
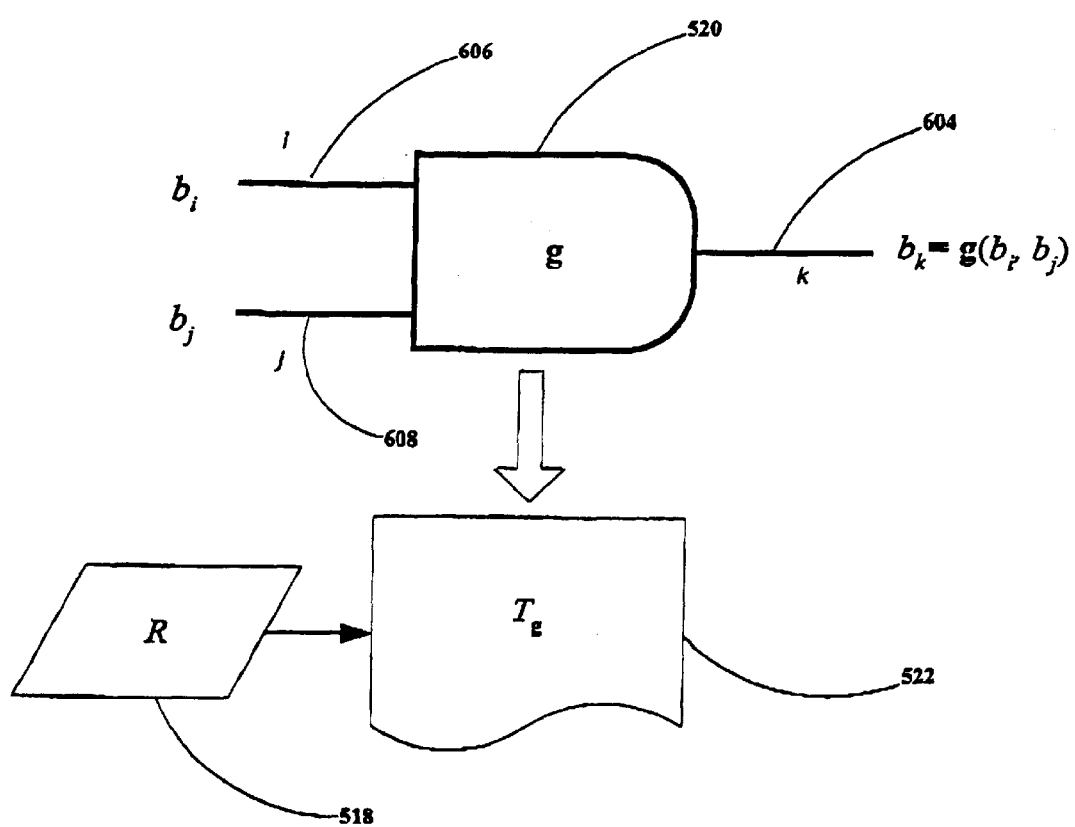
FIG. 6 illustrates a generic gate and translation table therefor.

FIG. 6 illustrates gate g 520, which is a generic gate that computes the value $b_k$ of an output wire k 604 as a function of the values $b_i$, and $b_j$ of input wires i 606 and j 608, respectively. Such a computation is denoted as $b_k = g(b_i, b_j)$. FIG. 6 also illustrates pseudo-random function R 518, which is used to prepare table $T_g$ 522.

Assume initially that the fan-out of every gate is 1. Table $T_g$ contains four entries of the form:

$$c_i, c_j: (W_k^{g(b_i, b_j)}, c_k) \text{ XOR } R_{W_i}^{b_i}(c_j) \text{ XOR } R_{W_j}^{b_j}(c_i),$$

where $0 \leq i \leq j \leq 1$.

The value $c_k$ is given by $c_k = \pi_k(b_k) = \pi_k(g(b_i, b_j))$. The entry does not have to include the index $c_i, c_j$ since this is implicit in the entry's location.

Assume that A knows $c_i$, $c_j$ and the values $W_i^{b_i}$, $W_j^{b_j}$. In order to compute a gate, A finds the entry $c_i, c_j$ in the table $T_g$ for that gate, and performs an XOR (exclusive-OR) operation with the value $R_{W_i^{b_i}}(c_j)$ XOR $R_j^{b_j}(c_i)$ to get the value $W_k^{b_k} = W_k^{g(b_i, b_j)}$, and of $c_k$.

Coding the Input:

Given the table $T_g$ of the gates, and the garbled values $W_i^{b_i}$ and $c_i$ which correspond to the input wires, it is easy to compute the garbled values of the output wires of the circuit. A knows the values of the input bits and should obtain the values of the corresponding wires.

In a step 528, for each gate in circuit 506, B sends to A the table $T_g$ 522 that codes the gate.

In a step 530, B sends to A the table $T_O$ 526 that decrypts the garbled values of the output of the circuit the output bits of the circuit.

In a step 532, for each gate input wire in the circuit, A and B engage in an Oblivious Transfer, at the end of which A learns the garbled value of the wire's input bit (but nothing about the garbled value of the input bit of the other wire into the gate), and B learns nothing.

Computing the Circuit:

A now has enough information, in a step 534, to compute the output of the circuit for the input x. However, since A does not know the garbled values for any other input bits, A cannot compute information about $f(x_0)$ for any $x_0 \neq x$ (except, of course, information that can be deduced from $f(x)$ alone).

Note that the communication between the two participants A and B can be done in a single back-and-forth round, and B can prepare the circuit in advance, before the input is known to A.

To handle a gate fan-out greater than 1, it is simply required to use a different input to the pseudo-random function A at each gate in which the wire is used. (If the same value be used in different gates, then it will be possible to cancel the application of the pseudo-random function R by an XOR, operation, and A could thereby learn relationships between garbled values.) Suppose that the fan-out of wire i is M, then in a gate m ($1 \leq m \leq M$) which uses wire i as input, the masking value that is used should be $R_{W_i^{b_i}}(c_j, m)$. That is, the pseudo-random function R should be applied to the concatenation of $c_j$ and m. Alternatively, it is possible to assign each gate a unique identifier $I_g$, and use $R_{W_i^{b_i}}(c_j, I_g)$.

It is also possible to adapt this protocol to circuits in which gates have more than two inputs, as well as for wires having more than two possible values. The size of the table for a gate with n inputs which each can have d values is $d^n$.

Prior Art Extensions

Yao's protocol, which is limited to two participants, has been extended in the prior art to handle multi-party inputs, as disclosed in "How to Play Any Mental Game", by O. Goldreich, M. Micali, and A. Wigderson, *Proceedings of the 19th ACM Symposium on Theory of Computing*, 1987, pages 218-229. These extended protocols, however, require a round of communication for each gate in the circuit, which is impractical in many applications, such as in auctions. The method of Goldreich et al. would require extensive interactive communication among the bidders in an auction, and is therefore not suitable. In contrast, the present invention does not impose the burden of extensive interactive communication and does not require the bidders to communicate among themselves, and therefore represents an improvement not only over Yao, but also over prior art extensions to Yao. The solution of Goldreich et al. is secure only for limited coalitions of less than one-third of the parties.

Secure Multi-Party Function Evaluation for Auctions

The secure multi-party function evaluation protocol of the present invention can be applied to the running of auctions as a non-limiting special case, and this application is used to illustrate the principles and operation of the present invention, not only for this special case, but also in general.

Figure 2:
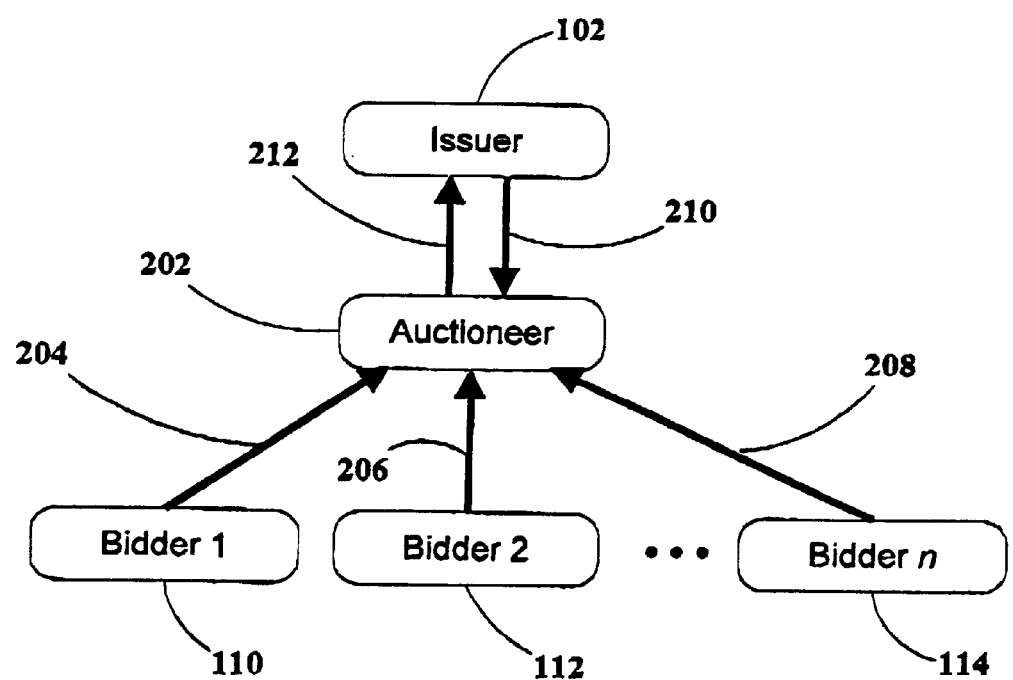
FIG. 2 illustrates the communication flow in an auction according to the present invention with a single issuer and a single auctioneer.

In an auction according to the present invention, there are three types of participants, as shown in FIG. 2.

Bidders 110, 112, . . . 114, who are parties that know the inputs;

an Issuer 102, who prepares the circuit that computes the auction; and the Auctioneer 202, who functions as a center for the bidders and learns the output of the circuit as the proxy of the issuer.

The function $f$, whose circuit is evaluated, is the function that computes the outcome of the auction. The bids of the bidders are the private inputs to this function Given the inputs and the function $f$, it is possible to determine the outcome of the auction. However, it is desired to maintain the privacy of the inputs, not only in terms of their values (the amounts of the bids), but also in terms of the dependency of $f$ on the inputs (who the bids were from). This is accomplished by the secure multi-party function evaluation protocol of the present invention, where the auctioneer serves as the proxy of the issuer to learn the outcome, using Proxy Oblivious Transfer.

Consider a second-price auction, where the bids are $(x_1, \ldots x_n)$. The function that computes the auction is $f(x_1, \ldots x_n) = h, s$ where h is the identity of the highest bidder $(x_h = \max(x_1, \ldots, x_n))$ and s is the second-highest bid $(s = \max(x_i, i \neq h)$. (The function $f$ also determines how ties are broken.)

A key observation about the protocol for secure two-party function evaluation is that if there are multiple inputs $x_1, \ldots, x_n$ (known to different parties) and somehow, the party A who was given the garbled version of a circuit that evaluates $f$ is given the garbled values for each of the $x_i$'s, then A can evaluate $f(x_1, \ldots, x_n)$ without learning anything else about the $x_i$'s themselves. Based on this observation, the present innovation transforms the secure two-party function evaluation protocol into a secure multi-party function evaluation protocol, such as for computing the results of auctions: In the case of an auction, participant A would be the auctioneer, the inputs are known to the bidders (the parties having private inputs), and participant B would be the issuer. The only step that is missing is letting the auctioneer learn the garbled values of the bidders' private inputs. This is done using Proxy Oblivious Transfer, as previously described. The issuer provides the garbled value of each state of each bit of a bidder's private input (and thereby in effect provides the garbled value for every possible private input). The actual value of each bit of a bidder's private input selects which garbled state should be used. In Proxy Oblivious Transfer, however, the auctioneer (the proxy) learns only the garbled value, not the actual bit value, and the issuer learns nothing. The result is that the auctioneer learns the garbled private inputs to the circuit and so can compute the function, while nobody learns the actual private input itself.

Figure 7:
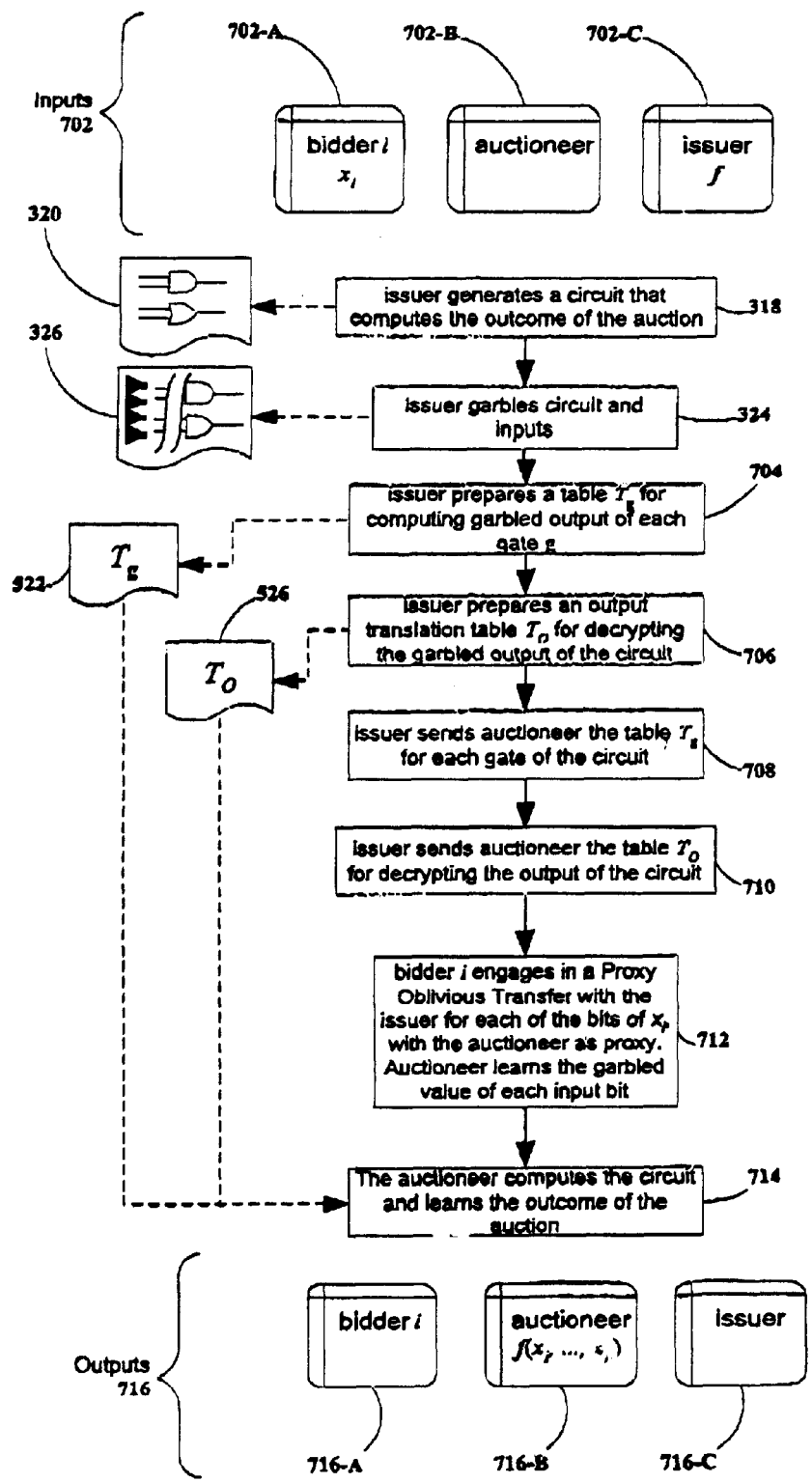
FIG. 7 illustrates a secure multi-party function evaluation for the special case of an auction, according to the present invention.

The protocol for a secure auction is as follows, as illustrated in FIG. 7. Some of the steps and data items have already appeared in FIG. 3 and FIG. 5.

Input:
Inputs 702 include
- Bidders: $x_1, \ldots, x_n$, where bidder i has bid $x_i$, in an input 702-A.
- Auctioneer: nothing, in an input 702-B.
- Issuer: description of a combinatorial circuit that computes $f$; in an input 702-C.

Output:
Outputs 716 include:
- Bidders: nothing, in an output 716-A.
- Auctioneer: $f(x_1, \ldots, x_n)$, in an output 716-B
- Issuer: nothing, in an output 716-C.

Encrypting the Circuit:
In a step 318 the issuer generates a circuit 320 that computes the outcome (output) of the auction.

In a step 324, the issuer garbles the circuit and inputs in exactly the same way that B garbled the circuit and inputs in the secure two-party function evaluation protocol described above and illustrated in FIG. 5.

In a step 704, the issuer prepares table $T_g$ 522 for computing garbled output of each gate g.

In a step 706 the issuer prepares an output translation table $T_O$ 526 for decrypting the garbled output of the circuit.

Sending the Circuit
In a step 708, the issuer sends the auctioneer table $T_g$ 522.
In a step 710, the issuer sends the auctioneer table $T_O$ 526.

Note that steps 318, 324, 704, 706, 708, and 710 can be performed by the issuer prior to the auction, as previously mentioned. This is the part of the protocol where the issuer can distribute the bulk of the data required for the auction in advance on suitable mass-storage media Coding the Input:
In a step 712 Each bidder i engages in a 1-out-of-2 Proxy Oblivious Transfer protocol with the issuer for each of the bits of $x_i$. The auctioneer is the proxy in this protocol, and at the end of the transfer the auctioneer learns the garbled value of each input bit, in exactly the same way that A learned the garbled value of each input bit in step 532 (FIG. 5) of the secure two-party function evaluation described previously, except for the fact that the auctioneer is the proxy in this case.

Computing the Circuit:
At the end of the 1-out-of-2 Proxy Oblivious Transfer stage, the auctioneer has enough information to compute the circuit in a step 114. That is, the auctioneer can determine the outcome of the auction.

Figure 3:
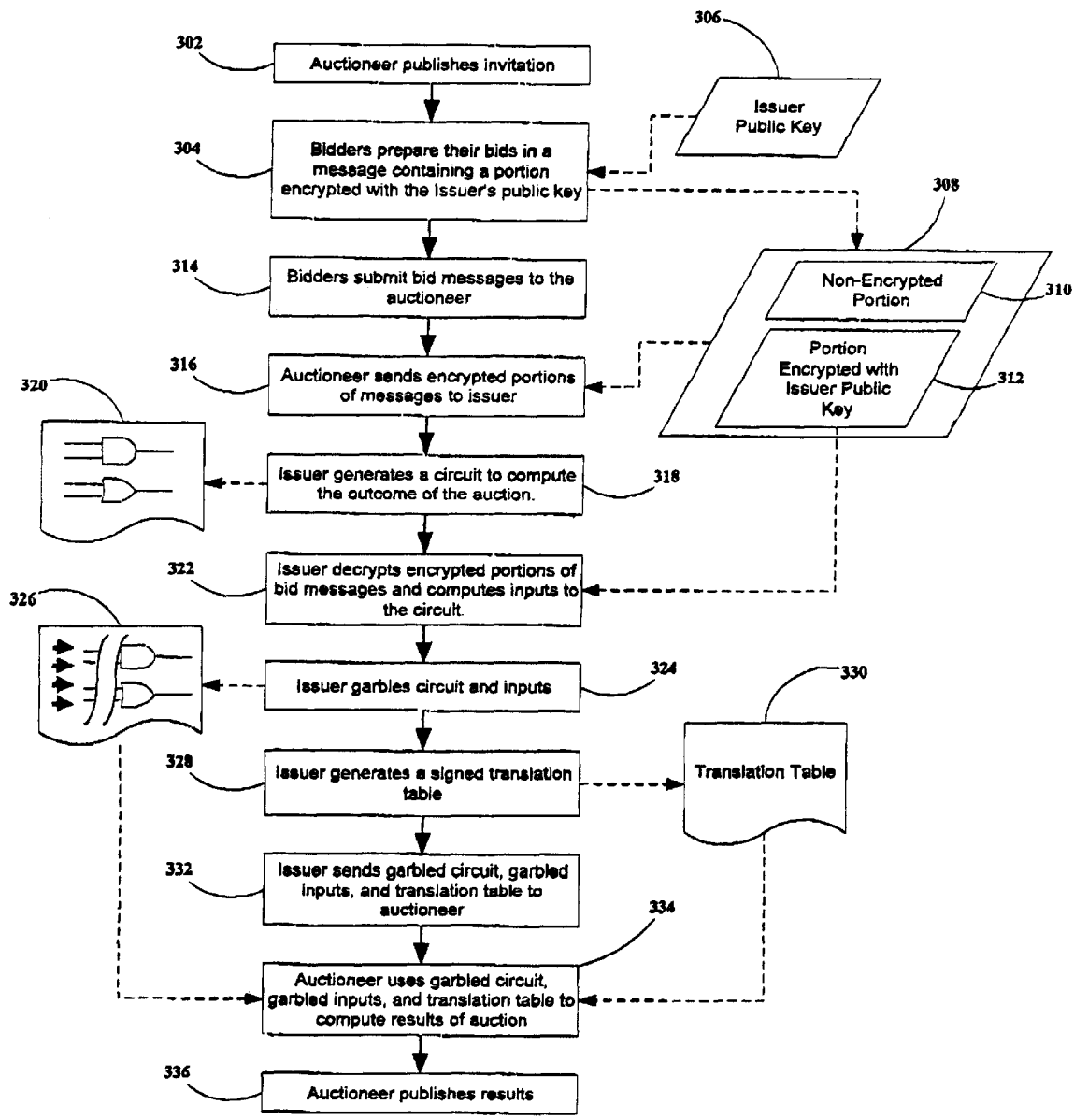
FIG. 3 shows the steps of the method for the special case of an auction according to the present invention, with a single issuer and a single auctioneer, and conceptually illustrates the information objects associated therewith.

Following are some properties of the protocol and some variants thereon:

Communication Pattern:
The bidders communicate only with the auctioneer. The communication pattern of the 1-out-of-2 Proxy Oblivious Transfer protocol consists of a first stage in which each bidder sends a message to the auctioneer and a message to the issuer; and a second stage in which the issuer sends a message to the auctioneer. This seemingly requires direct communication between each bidder and the issuer. However, the bidders can use the auctioneer as a secure communication channel to the issuer. As illustrated in FIG. 3, each bidder can take the message for the issuer, encrypt that message using issuer's public key 306 (using a non-malleable encryption scheme), and send it to the auctioneer, who then sends encrypted portion 312 to the issuer. After all the bidders have completed this phase, the auctioneer sends the messages to the issuer. (A "non-malleable" encryption scheme is any encryption scheme that allows detection, by the intended receiver, of any alteration in the ciphertext. It is crucial to encrypt these messages using non-malleable encryption to prevent the auctioneer from making any changes to the ciphertext that would result in changes to the cleartext. If, for example, the encryption scheme involved performing an XOR operation of the cleartext with a one-time pad, then it would be possible to reverse some bits of the cleartext message by reversing the corresponding bits of the ciphertext, and this alteration would not necessarily be detectable.)

Output Verification by Bidders:
Each bidder is able to verify that the auctioneer correctly computed the circuit that was sent by the issuer. Each bidder is also able to verify that the auctioneer indeed sent the submitted bid to the issuer (otherwise the bid was not considered in computing the outcome of the auction). In this way, each bidder is able to independently verify that the auction was conducted fairly and that the published outcome is correct.

In order to enable the bidders to verify the output of the auctioneer, the issuer generates a translation table of the output wires of the circuit. For each output wire i, the table contains the entries $(0, F(W_i^0))$ and $(1, F(W_i^1))$, where F is a one-way function (F(x) can be defined for example as $R_x(0)$, where R is the pseudo-random function which was used for garbling the circuit). The issuer signs this translation table. The auctioneer displays, for each output wire i, the values $b_i$, $W_i^{b_i}$. Each bidder can verify that $F(W_i^{b_i})$ appears in the signed translation table. Since F is a one-way function, the only way the auctioneer can generate $W_i^{b_i}$ is by correctly computing the circuit. In this maimer, each bidder can independently and easily verify that the auction was conducted properly.

In order to enable each bidder to verify that his bid was considered in the auction, the issuer signs some information received from the bidders, and the auctioneer displays this signature to the bidders. For example the issuer can compute a hash of the message that each bidder sent in the 1-out-of-2 Proxy Oblivious Transfer phase, and sign the list of hash values. Each bidder can check that the issuer signed the hash of his message to verify that his bid was properly entered into the auction.

Protecting Against an Attack by a Corrupt Auction Issuer:
It is possible that the issuer might collude with a bidder. For example the issuer might provide a program which always declares a certain bidder as the winner. This type of attack can be detected with a "cut and choose" technique:

- The issuer provides 2m versions of the program to the auctioneer.
- The auctioneer selects m of the versions at random
- The issuer removes the encryption from the m versions selected by the auctioneer.
- The auctioneer examines the m selected versions to verify that they all correspond to the encrypted versions and that they all compute the desired function $f$.
- The auctioneer verifies that the other versions (which still have the encryption in place) yield the same output.
- The auctioneer randomly selects one of the versions which still has the encryption in place to use in the auction.

The probability that a corrupt issuer will go undetected by this procedure is exponentially small in m. Even using only 2m=2 versions and opening one of them should be enough, since an issuer caught cheating even once would (at least) lose credibility, and so the risk-to-benefit ratio of such a collusion is very small.

Distributing the Auctioneer:

In another embodiment of the present invention, the trust that bidders must put in the auction system is further reduced by distributing the task of the auctioneer among p participants, as depicted in FIG. 1. Ideally, these would be different entities, and no partial coalition of at most P of them would know all the information would be known to a single auctioneer. A coalition of any P of these servers computes the output of the function with the help of the issuer, similar to that of a single-auctioneer scenario. The coalition of servers can perform this computation using, for example, the protocols of Goldreich et al.

Figure 8:
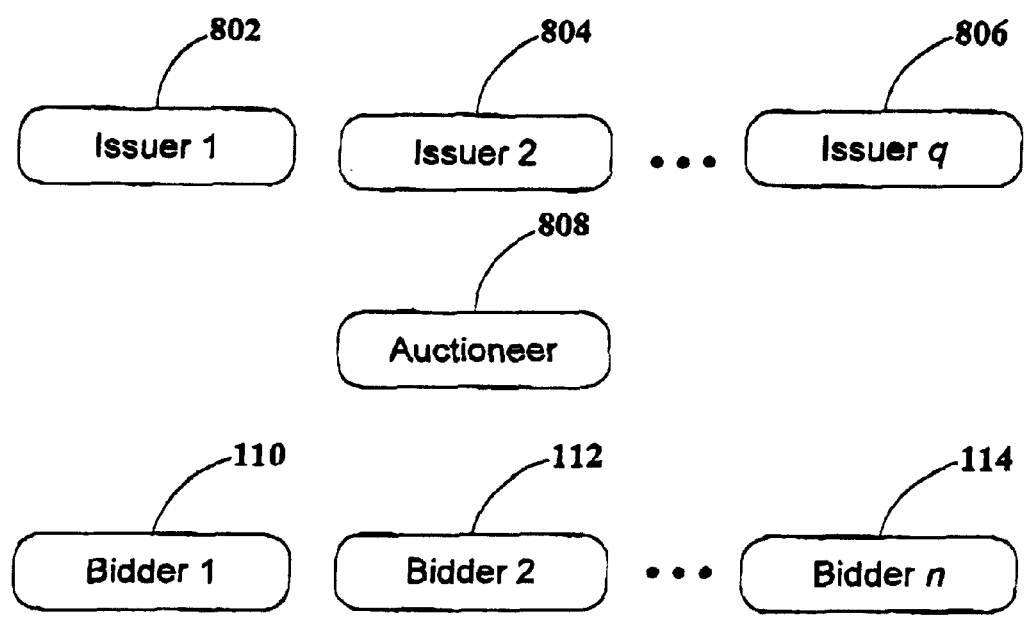
FIG. 8 illustrates the participant in an auction according to the present invention with a distributed issuer function.

Distributing the Issuer:

In still another embodiment of the present invention, the trust that bidders must put in the auction system is further reduced by distributing the task of the issuer among q participants, as is depicted in FIG. 8, including an issuer 802, an issuer 804, and an issuer 806, who in this example work with a single auctioneer 808. Ideally, issuers 802, 804, and 808 would be different companies, and none of them would know all the information that would be known to a single issuer. A more modest goal is to have a single participant that generates the garbled circuit, and then distributes each garbled gate among several issuer servers. The system could have a threshold k such that the auctioneer must contact k servers in order to compute the auction, and a collusion between the auctioneer and k−1 servers reveals nothing about the bids (note that a naive use of secret sharing does not achieve this property). The distribution of the issuer can be done using the protocols disclosed in the previously-cited work by Goldreich et. al.

Optimizing the Protocol:

Two types of optimization are possible: optimizations of the circuit that computes the protocol and optimizations of the primitives that are used by the protocol.

Optimizing the Circuit:

The circuit for second-price auctions compares all the bids, and outputs the identity of the highest bidder and the value of the second-highest bid. Consider an auction with n bidders, where a bid is an integer in the range [1; L] (i.e. it can be represented by l=log L bits). There is a circuit which uses about 36nl table entries (some of the wires in this circuit are not binary, but rather have one of three values). Note that even for n−1000 users, and bids with one million possible values, the size of the circuit is moderate, 36*1000*20=720,000 table entries. Assuming that each entry is 80 bits, the total size is about 7 Mbytes.

Sources of Overhead

The overhead of computing the protocol has three main components: communication between the issuer and the auctioneer, computing the Oblivious Transfer, and computing the circuit.

Oblivious Transfer can be implemented using El Gamal encryption with a 1024 bit modulus. Better efficiency can be achieved if elliptic curve cryptography is used (this reduces the communication requirements by about a factor of 6). Following are performance estimates that are achieved after some optimization of the Oblivious Transfer protocol (optimization is based on using an encryption variation of the form $(g^f; (g^x)^{rm})$, which can use the same random value r without affecting the security. This reduces the communication and encryption overhead by a factor of two. Furthermore, the decryption process can be further optimized to use the fact that it raises the same $g_r$ to many powers (the different private keys).

Communication:

The circuit contains about 36 table entries per input bit, which take 360 bytes if the keys used for the pseudo-random function are 80 bits long. The tables can be sent from the issuer to the auctioneer in advance or the auction (such as on a CD-ROM or DVD). The online communication overhead for each input bit involves the issuer receiving one public key and sending two encryptions, a total of 384 bytes.

Note that the communication overhead for each bidder does not depend on the number of other bidders or the inputs of the other bidders.

Oblivious Transfer

The encryption phase of the Oblivious Transfer requires the issuer to perform two exponentiations per input bit, and the decryption phase requires the auctioneer to perform one exponentiation.

Computing the Circuit

For each gate, the auctioneer computes two values of a pseudo-random function. This overhead is negligible since the throughput of block ciphers or hash functions (which are used to implement the pseudo-random function) is millions of operations per second.

Overhead of the Protocol

The circuit that computes the output of an auction is of reasonable size. As discussed above, for example, if there are n bidders and the bids are in a range which contains $L=2^i$ possible bids, then the number of gates in a circuit which computes a second-price auction is $O(n \log L)=O(nl)$ with a small constant. The evaluation of the circuit requires the issuer and the auctioneer to perform a few applications of a pseudo-random function per gate, and a few applications of a public key operation per input bit. On a modern processor it is possible to perform millions of one-way functions per second, and tens of public-key operations per second. Therefore the protocol has a computation overhead of the order of a second per bidder.

Other Applications of the Invention

The overhead of the protocol depends only on the size of the combinatorial circuit that evaluates the function which decides the outcome of the auction. It is therefore possible to use the same protocol for computing various other types of auctions and applications which can be expressed as a circuit of moderate size. Following are some examples of functions which can be privately computed by the present invention.

First-Price Auctions

The only difference between a protocol for a first-price auction and that for a second-price auction is that they use a different circuit to compute the output. A first-price auction protocol uses a circuit which computes the maximum of all bids, and the identity of the highest bidder. A protocol for second-price auction uses a circuit which outputs the identity of the highest bidder and the second-highest bid.

$k^{th}$-Price Auctions

Similar circuits can be used to express $k^{th}$-price auctions, where the winner is the highest bidder and the clearing price is the $k^{th}$-highest bid. Such auctions have been proposed as suitable for risk-seeking bidders. Note that this type of auctions does not have a corresponding interactive implementation (i.e. an open-cry auction) which can guarantee that the auctioneer does not misuse the received bids (such implementations exist for second- and first-price auctions in the form of the English and the Dutch auctions).

Double Auctions

In double auctions there are several sellers and several buyers. Assume that there are M sell offers and N buy offers. Common auction rules for this case are the $M^{th}$-price and $(M+1)^{th}$-price rules. These rules can be easily expressed as circuits, and can therefore be easily implemented by the present invention.

Generalized Vickrey Auctions:

The Generalized Vickrey Auction (GVA) is known in the art as a powerful mechanism which can solve many complex problems. In this mechanism each party reports a utility function, and the center calculates the allocation that maximizes the sum of the reported utility functions, subject to resource constraints. The payment of party i depends on the difference between the sum of the utility functions of the other parties in the chosen allocation, and the sum of their utility functions in the allocation which does not take party i into account. The GVA mechanism can be used to sell multiple units of the same goods to consumers who have a utility function which depends on the number of units they receive, or to decide on the contribution of public goods by consumers who initially own them. The GVA can be expressed as a small circuit if the utility functions of the consumers are not too complex. For example, in the problem of selling M units of the same goods, each consumer's utility function can be simply a list of the values for the $1^{st}$, $2^{nd}$, and up to the $M^{th}$ unit of the goods. Therefore, each consumer's input is composed of M values, and the circuit that decides on the outcome of the mechanism is relatively simple.

Mechanism Design

The creation of algorithms by mechanism design is known in the art, to solve a global problem among a number of selfish agents (e.g. routing, or some cooperation between the agents). The present invention can be used to compute these algorithms without requiring us in the center. The plausibility of using the present invention for such a task depends on the complexity of expressing the utility functions and decision procedure in terms of circuits.

A particular case of interest is the Groves-Clarke mechanism, where the public good is served if the sum of reported values is higher than some threshold. The circuit which computes this function is very simple, as is the circuit which computes the sum of the reported values for several options, and decides on the option with the highest sum. It is therefore very easy to use the present invention to provide a private protocol which computes a Groves-Clarke mechanism.

Opinion Polling

Another relevant application is the design of mechanisms to elicit opinions of a group of independent experts. The application enables parties to contribute their opinion to a decision making without being worried that their opinion would be revealed.

It is known in the art that where experts want their recommendation to be accepted, that there exists a mechanism with a single equilibrium which achieves the public target (but such a mechanism does not exist if experts care only about the public good). Such a mechanism can be implemented very efficiently by the present invention. This essentially requires that one expert chooses a subset of the experts whose opinions are considered, learns their opinions, and then adds his opinion. The group decision is the majority opinion. Note that this process requires privacy, because the expert who chooses the subset must do so before learning the opinions of that subset. A privacy-preserving implementation of this application is useful in organizations that want to poll the opinions of their members, but realize that individuals might bias their reported opinion if it might become known to others.

Another application is for polling the opinions of a group of people, while hiding the individual opinions of the participants. Consider for example an opinion poll (such as the Gallup Poll) which contains many questions (such as the Gallup Poll). Suppose that the poll is anonymous, and the organizer obtains lists of answers, one list for each participant. Suppose also that only a single participant answered affirmatively to a certain question, and that the organizer can guess with very high probability who this participant is. Then, although the answers are anonymous, the organizer can learn the answers of this participant to all the questions. The present invention enables the sending of questions to the group members, and the processing of their answers to obtain commutative outputs without revealing any information about individual answers. Additional applications of the present invention thus include multiple-question opinion polls, sociometric research, and voting and elections.

Stable Matching

Stable matching is yet another example of a global decision which depends on the private preferences of many parties. In many scenarios it is plausible that parties would be hesitant to reveal their matching preferences, even to the center that computes the matching (consider, for example, matching couples for a prom). The present invention enables the parties to reveal their true preferences without being afraid that the center can learn them. As with other applications, the overhead of implementing the present invention for this application depends on the complexity of expressing the matching algorithm as a combinatorial circuit.

While the invention has been described with respect to a limited number of embodiments, it will be appreciated that many variations, modifications and other applications of the invention may be made.

What is claimed is:

1. A method for the secure evaluation of a function by a group of participants, wherein each of a plurality of parties furnishes a private input to the function, and wherein, except for what may be deduced from the output of the function, the function is evaluated without any participant learning any information about the private input of any other participant, the method comprising:

(a) providing exactly two servers, including:
  (i) providing an issuer server as a participant, said issuer server being operative to preparing a description corresponding to the function;
  (ii) providing a center server as a participant, said center server being operative to evaluating the function from said description;
(b) having each of the plurality of parties send a private input such that only said issuer server learns a first portion of said private input, and such that only said center server learns a second portion of said private input, wherein both said first portion and said second portion are necessary to learn said private input; and
(c) having said issuer server and said center server evaluate the function from said description, such that only said center server learns the output of the function, and such that said center server does not learn the private inputs thereto.

2. The method as in claim 1, wherein said description is a circuit of gates corresponding to the function.

3. The method as in claim 1, wherein the private inputs are each represented by a number containing at least one digit, each digit having a value selected from a predetermined set of values, the method further comprising the step of each of the parties engaging in a Proxy Oblivious Transfer with said issuer server and said center server, wherein said issuer server provides a first encryption of every value in the predetermined set of values for each digit, and wherein said center server learns said first encryption for each digit without learning the selected value of the digit.

4. The method of claim 3, wherein said Proxy Oblivious Transfer further comprises:
  (e) each party preparing, for each digit, a plurality of public keys, one for each value of the predetermined set of values for each digit, and a private key corresponding only to the selected value of the digit;
  (f) said issuer server preparing a plurality of second encryptions, one of every of said first encryption of every value of the predetermined set of values for each digit, using the corresponding public key of said plurality of public keys; and
  (g) said center server decrypting said plurality of second encryptions for each digit with said private key to recover said first encryption of said selected value of each digit.

5. The method as in claim 1, further comprising the center server's proving that the evaluation of the function was correct.

6. The method as in claim 1, wherein the output of the function contains statistical information about the private inputs.

7. The method as in claim 1, wherein the parties are bidders in an auction, wherein the function determines only the winner of the auction and the clearing price, and wherein said center server is an auctioneer.

8. The method as in claim 7, wherein said auction is any of a group including first-price auctions, second-price auctions, kth price auctions, double-auctions, and Generalized Vickrey Auctions.

9. The method as in claim 7, wherein said bidders are buyers and said auctioneer is a seller.

10. The method as in claim 7, wherein said bidders are sellers and said auctioneer is a buyer.

11. A system for the secure evaluation of a function by a group of participants, wherein each of a plurality of parties furnishes a private input to the function, and wherein, except for what may be deduced from the output of the function, the function is evaluated without any participant learning any information about the private input of any other participant, the system comprising:
  (a) exactly two servers, including:
    (i) an issuer server, said issuer server operative to preparing a description corresponding to the function and to learning a first portion of the private input; and
    (ii) a center server, said center server being operative to evaluating the function from said description and to learning a second portion of the private input;
  wherein
both said first portion and said second portion are necessary to learn said private input; and said issuer server and said center server evaluate the function from said description by engaging in a secure two-party function evaluation, such that only said center server learns the output of the function, and such that said center server does not learn the private inputs thereto.

12. The system as in claim 11, wherein said description is a circuit of gates corresponding to the function.

13. The system as in claim 11, wherein the private inputs are each represented by a number containing at least one digit, each digit having a value selected from a predetermined set of values, wherein each of the parties engages in a Proxy Oblivious Transfer with said issuer server and said center server, wherein said issuer server provides a first encryption of every value in the predetermined set of values for each digit, and wherein said center server learns said first encryption for each digit without learning the selected value of the digit.

14. The system of claim 13, wherein said Proxy Oblivious Transfer further comprises:
  (i) a plurality of public keys for each digit, one for every each of the values in the predetermined set of values, and a private key corresponding only to the selected value of the digit; and
  (ii) a plurality of second encryptions, one of every of said first encryption of every value in the predetermined set of values, using the corresponding public key of said plurality of public keys.

15. The system as in claim 11, wherein the center server is furthermore operative to proving that the evaluation of the function was correct.

16. The system as in claim 11, wherein the output of the function contains statistical information about the private inputs.

17. The system as in claim 11, wherein the parties are bidders in an auction, wherein the function determines only the winner of the auction and the clearing price, and wherein said center server is an auctioneer.

18. The system as in claim 17, wherein said auction is any of a group including first-price auctions, second-price auctions, kth price auctions, double-auctions, and Generalized Vickrey Auctions.

19. The system as in claim 17, wherein said bidders are buyers and said auctioneer is a seller.

20. The system as in claim 17, wherein said bidders are sellers and said auctioneer is a buyer.

21. A method for the secure evaluation of a function by a group of participants, wherein each of a plurality of parties furnishes a private input to the function, and wherein, except for what may be deduced from the output of the function, the function is evaluated without any participant learning any information about the private input of any other participant, the method comprising:
  (a) providing at least one issuer server as a participant, said at least one issuer server being operative to preparing a description corresponding to the function;
  (b) providing at least one center server as a participant, said at least one center server being operative to evaluating the function from said description;
  (c) having each of the plurality of parties send no more than one private input to no more than one center server such that only said at least one issuer server learns a first portion of said private input, and such that only said at least one center server learns a second portion of said private input, wherein both said first portion and said second portion are necessary to learn said private input; and
  (d) having said at least one issuer server and said at least one center server evaluate the function from said description, such that only said at least one center server learns the output of the function, and such that said at least one center server does not learn the private inputs thereto.

22. A system for the secure evaluation of a function by a group of participants, wherein each of a plurality of parties furnishes a private input to the function, and wherein, except for what may be deduced from the output of the function, the function is evaluated without any participant learning any information about the private input of any other participant, the system comprising:
  (a) at least one issuer server, said at least one issuer server operative to preparing a description corresponding to the function and to learning a first portion of the private input; and (b) at least one center server, said at least one center server being operative to evaluating the function from said description and to learning a second portion of the private input;
wherein
both said first portion and said second portion are necessary to learn said private input; and said at least one issuer server and said at least one center server evaluate the function from said description by engaging in a secure two-party function evaluation, such that only said at least one center server learns the output of the function, such that said at least one center server does not learn the private inputs thereto, and such that each participant sends no more than one private input to no more than one center server.

* * * * *